(12) United States Patent
Kinnard

(10) Patent No.: US 6,851,697 B2
(45) Date of Patent: Feb. 8, 2005

(54) TRAILER ALIGNMENT SYSTEM AND METHOD

(76) Inventor: Max E. Kinnard, 5336 E. Woolbridge Rd., Acampo, CA (US) 95220

( * ) Notice: Subject to any disclaimer, the term of this patent is extended or adjusted under 35 U.S.C. 154(b) by 0 days.

(21) Appl. No.: 10/618,276

(22) Filed: Jul. 11, 2003

(65) Prior Publication Data

US 2004/0017060 A1 Jan. 29, 2004

Related U.S. Application Data

(60) Provisional application No. 60/395,106, filed on Jul. 11, 2002.

(51) Int. Cl.[7] .................................................. B60D 1/36
(52) U.S. Cl. ...................................................... 280/477
(58) Field of Search ........................... 280/477; 33/264; 116/28 R (56) References Cited

U.S. PATENT DOCUMENTS

| | | | | |
|---|---|---|---|---|
| 3,867,898 A | * | 2/1975 | Lakamp | 116/28 R |
| 3,901,536 A | | 8/1975 | Black | 280/477 |
| 4,065,147 A | * | 12/1977 | Ross | 280/477 |
| 4,313,264 A | * | 2/1982 | Miller, Sr. | 33/264 |
| 4,583,481 A | | 4/1986 | Garrison | 116/28 R |
| 4,621,432 A | | 11/1986 | Law | 33/264 |
| 4,666,176 A | * | 5/1987 | Sand | 280/477 |
| 4,687,220 A | | 8/1987 | Danielson | 280/477 |
| 5,035,441 A | | 7/1991 | Murray | 280/477 |
| 5,290,056 A | | 3/1994 | Fath, IV | 280/477 |
| 5,518,263 A | | 5/1996 | Owens | 280/477 |
| 5,669,621 A | | 9/1997 | Lockwood | 280/477 |
| 5,680,706 A | | 10/1997 | Talcott | 33/286 |
| 6,042,136 A | | 3/2000 | Heinecke | 280/477 |
| 6,168,181 B1 | | 1/2001 | Gadd | 280/477 |
| 6,273,448 B1 | | 8/2001 | Cross | 280/477 |
| 2002/0070529 A1 | * | 6/2002 | Dravecz | 280/477 |

* cited by examiner

*Primary Examiner*—Kevin Hurley
(74) *Attorney, Agent, or Firm*—Henneman & Saunders; Larry E. Henneman, Jr.

(57) ABSTRACT

A guide for aligning a tow vehicle with a trailer utilizes a flexible position member having a first end, a second end, and an alignment mark near the second end, a body adapted to slidably engage the position member such that the first end extends horizontally from the body and the second end extends vertically from the body, a mount for attaching the body of the guide to the trailer whereby when the tow vehicle approaches the trailer, the tow vehicle pushes the position member through the body such that the height of the alignment mark is indicative of the distance between the tow vehicle and the trailer. Optionally, the guide includes a visual sight for laterally aligning the tow vehicle with the trailer. In a particular embodiment the position member is a flexible steel tape. A method for using the guide is also disclosed.

35 Claims, 6 Drawing Sheets

TRAILER ALIGNMENT SYSTEM AND METHOD

RELATED APPLICATIONS

This application is a continuation-in-part of U.S. Provisional Patent Application Ser. No. 60/395,106, filed Jul. 11, 2002, by the same inventor, entitled "Trailer Alignment System And Method," which is incorporated herein by reference in its entirety.

BACKGROUND OF THE INVENTION

1. Field of the Invention

This invention relates generally to hitches for trucks and trailers, and more particularly to an apparatus and method for aligning the hitch of a tow vehicle with the receiver of a trailer.

2. Description of the Background Art

It is common for tow vehicles, such as trucks and SUVs, to tow trailers for both business and recreational purposes. Generally, the tow vehicle has a ball-type hitch and the trailer has a receiver for accepting the ball of the hitch. It is a well-known fact that backing a truck into alignment with a stationary trailer is difficult for most drivers, especially when unassisted, and often requires many corrections before proper alignment is obtained.

There are several common problems drivers face when attempting to align the hitch of the truck with the receiver of the trailer. Foremost, drivers typically cannot see the hitch and receiver as they are backing toward the trailer and therefore must estimate the position of the hitch with respect to the receiver. While backing the driver must be aware of and compensate for both lateral and longitudinal positions of the truck hitch with respect to the receiver of the trailer. Bad estimation and lack of control of the vehicle often results in the driver having to repeatedly stop and exit the vehicle to check the alignment of the truck and trailer, which results in a lengthy hitching process. Furthermore, backing the truck toward the trailer could also result in impact damage to the trailer due to over-backing. Finally, the foregoing difficulties are especially prevalent when another person is unavailable to help guide the driver during the hitching process.

What is needed, therefore, is an alignment system that facilitates the rapid alignment of the hitch of the tow vehicle and the receiver of the trailer without the driver having to leave the vehicle, and without the aid of an extra person.

SUMMARY

The present invention provides an advantage over the prior art by providing an alignment system and method which allow an operator of a tow vehicle (i.e. a truck) to quickly align the hitch of the tow vehicle with a receiver of a trailer without assistance.

One embodiment of the present invention is a guide for aligning a tow vehicle with a trailer, and includes a flexible position member, a body adapted to slidably engage the position member, and a mount for attaching the body of the guide to the trailer. The body is adapted to engage the position member such that a first end of the position member extends horizontally from the body and a second end of the position member extends vertically from the body. Additionally, the flexible position member includes an alignment mark near it's second end, whereby when the tow vehicle pushes the flexible position member through the body, the height of the alignment mark is indicative of the distance between the tow vehicle and the trailer. The guide is positioned on the trailer such that the position member contacts a flat portion of the tow-vehicle, usually the license plate. In a particular embodiment, the flexible position member is formed from a flexible, semi-rigid material such as steel tape.

It should be understood that various embodiments of the alignment mark are possible. For example, the alignment mark can be made adjustable by using a moveable sticker, or alternately, the alignment mark could simply be represented by the second distal end of the position member itself.

In a particular embodiment, the body includes one or both of a horizontal tape support and a vertical tape support which help support the flexible position member. Optionally, either tape support can include one or more retainers to retain the position member in the tape support. In a more particular embodiment, the vertical tape support includes a target mark such that alignment of the alignment mark with the target mark indicates proper alignment of the tow-vehicle vehicle and the trailer. Similar to the alignment mark, the position of the target mark is optionally adjustable (e.g., a moveable sticker). Optionally, the target mark can be positioned on the rear window of the tow vehicle, or on a rear view mirror, such that it is visible to the driver of the tow vehicle when backing.

The mount also has several notable features. In a particular embodiment, the mount of the guide includes a first portion for engaging the trailer and a second portion for detachably engaging the body of the guide. In a more particular embodiment the first portion of the mount is a clamp for coupling to the jackpost of the trailer, and the second portion is a vertical member adapted to slidably engage a portion of the body. Optionally, a portion of the vertical member and a complementary portion of the body are dovetailed or slotted to better engage one another. Additionally, the bottom distal end of the vertical member can be angled to vertically position the body of the guide on the vertical member of the mount.

In another particular embodiment, the guide of the present invention includes a visual sight that engages the tow vehicle to aid the driver in laterally aligning the tow vehicle with respect to the trailer. In one particular embodiment, the visual sight is a cover having a stripe thereon, which is placed over a raised tailgate of the tow vehicle. In another particular embodiment, the visual sight is a mark on the tow vehicle visible through one of the vehicles rear view mirrors. Such sight marks can include, without limitation, stickers placed on the rear window, the rear view mirror of the tow vehicle, or any other convenient location. In an even more particular embodiment, the visual sight also functions as a target mark, such that the alignment of the alignment mark and the target mark indicate proper alignment of the tow vehicle.

A method for aligning a tow vehicle with a trailer using a guide of the present invention includes the steps of fitting the trailer with a guide of the present invention, extending the first end of the flexible position member toward the tow vehicle, backing the tow vehicle toward the trailer to engage the first end of the position member with the tow vehicle, and pushing the position member through the guide until the second end of the position member reaches a predetermined height. Optionally, the position member includes an alignment mark disposed near its second end, and the step of pushing the position member through the guide includes pushing the position member through the guide until the alignment mark reaches a predetermined height, as indicated by its alignment with a target mark disposed on the guide.

Finally, aligning the tow vehicle and trailer includes laterally aligning the tow vehicle with the trailer by aligning a visual sight with a portion of the guide.

In a particular method, wherein the mount includes a first and a second portion, the step of mounting the guide to the trailer includes first securing the first portion of the mount to the jackpost of the trailer and then engaging the body with the second portion of the mount. In the event that the second portion of the mount is a vertical member, the step of engaging the body with the second portion includes sliding a portion of the body onto the vertical member. In a more particular method, wherein the first portion of the mount is coupled to a removable magnetic base, the step of mounting the guide to the trailer includes magnetically coupling the removable base to the trailer.

Another particular method includes the step of initially calibrating the guide for use with a particular tow vehicle. Initially calibrating the guide includes the steps of aligning the tow vehicle and the trailer, attaching a mount for the guide to the trailer, attaching the guide to the mount, extending the first end of the position member toward the tow vehicle until it contacts a flat portion (e.g., the license plate) of the tow vehicle, and installing the alignment mark and/or the target mark on one of the guide, the tow vehicle, or the trailer. Optionally, the visual sight can be installed on the tow vehicle during calibration.

BRIEF DESCRIPTION OF THE DRAWINGS

The present invention is described with reference to the following drawings, wherein like reference numbers denote substantially similar elements.

DETAILED DESCRIPTION

The alignment system of the present invention overcomes the problems associated with the prior art by providing a novel guide and method allowing an operator of a tow vehicle (i.e. a truck) to quickly align the hitch of the truck with a receiver of a trailer without assistance.

Figure 1A:
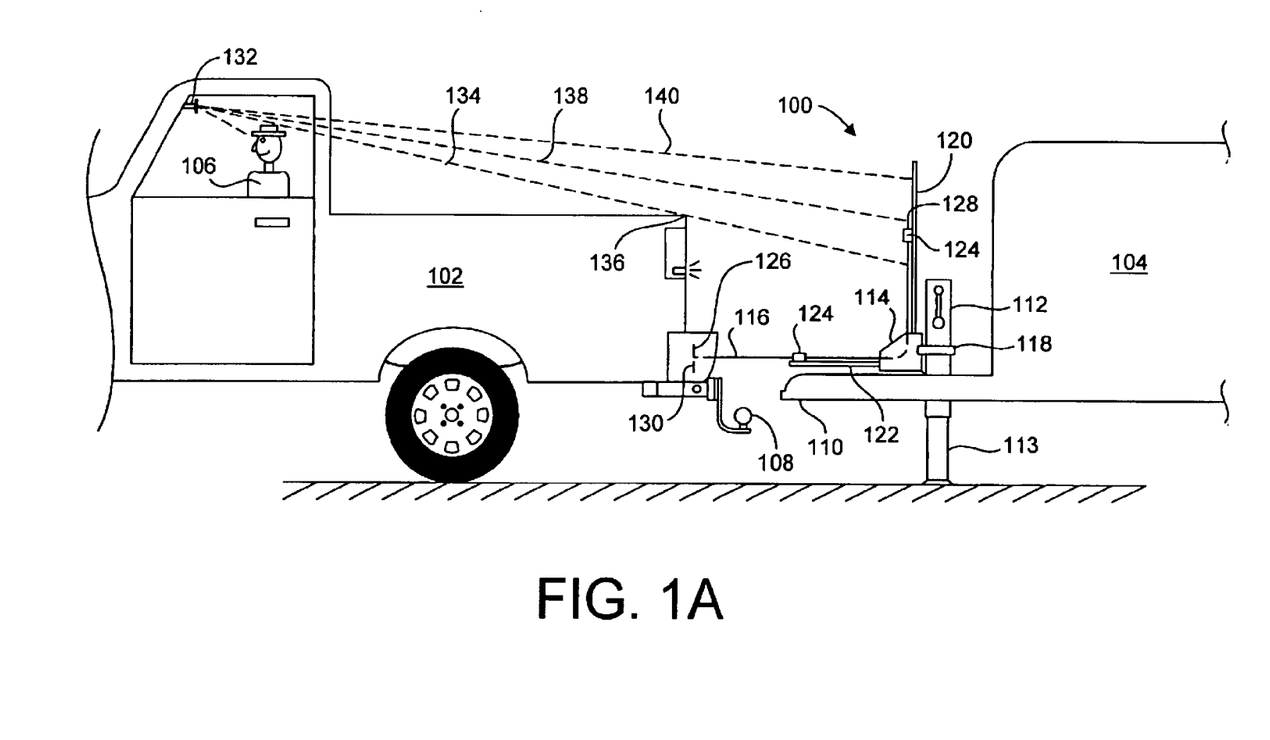
FIG. 1A shows an operator in the process of aligning the hitch ball of a tow vehicle with the receiver of a trailer using a guide of the present invention.

FIG. 1A shows a guide 100 for aligning a tow vehicle 102 (e.g., a truck) with a trailer 104. Truck 102 is driven by a driver 106, and includes a trailer hitch with a ball 108. Trailer 104 includes a receiver 110 for receiving and coupling to ball 108, and also includes a jackpost 112 housing a jack 113 used to raise and lower trailer 104. As used herein, aligning truck 102 with trailer 104 refers to aligning ball 108 under receiver 10 both longitudinally (along the page) and laterally (into and out of the page) using guide 100.

Guide 100 includes a body 114, a flexible position member 116 slidably engaged by body 114, a mount 118, a vertical tape support 120, a horizontal tape support 122, and a plurality of position member retainers 124. In this embodiment, position member 116 is a flexible steel tape including a first end 126, a second end 128, and an alignment mark (not shown) disposed near second end 128. In the present embodiment, first end 126 of position member 116 is abutting a license plate 130 of truck 102. However, first end 126 can contact any generally flat surface (e.g., the rear bumper, the tailgate, etc.) of truck 102 and still function correctly. Finally vertical tape support 120 includes a target mark (not shown) for aligning with the alignment mark of position member 116.

Driver 106 can make several visual references of guide 100 through a rear view mirror 132 of truck 102. First, driver 106 can check the lateral alignment of truck 102 with trailer 104 via a visual lateral alignment reference 134. Visual Reference 134 permits driver 106 to use a visual sight (not shown) attached to a tailgate 136 of truck 102 to laterally align truck 102 with a portion of guide 100 such as vertical tape support 120 and/or position member 116. Additionally, a longitudinal alignment reference 138 and a target reference 140 permit driver 106 to determine the distance between ball 108 of truck 102 and receiver 110 of trailer 104. For example, longitudinal alignment reference 138 intersects position member 116 at the alignment mark located thereon. Similarly, target reference 140 intersects vertical tape support 120 at the target mark located thereon. The distance between the alignment mark and the target mark, viewed by driver 106 via visual references 138 and 140 respectively, indicates the distance between ball 108 and receiver 110.

Figure 1B:
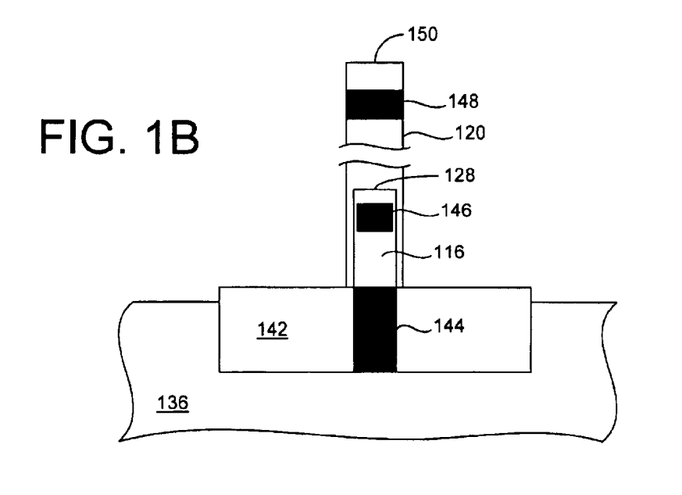
FIG. 1B is a view from the rearview mirror of FIG. 1A showing a visual sight engaging the tailgate of the tow vehicle of FIG. 1A, and aligned laterally with a portion of the guide of the present invention, and showing an alignment mark unaligned with a target mark.

FIG. 1B shows a portion of what driver 106 sees when looking through rear view mirror 132. A visual sight 142 is, in this embodiment, a cover placed over the center of tailgate 136, and includes a stripe 144 printed thereon. Flexible position member 116 includes an alignment mark 146 disposed near second end 128. Vertical tape support 120 also is shown to include a target mark 148 disposed near an upper distal end 150 thereof.

Visual sight 142 facilitates lateral alignment of truck 102 and trailer 104 as follows. Visual sight 142 is draped over raised tailgate 136 at a position that is determined in a calibration step, as will be explained below. When backing, driver 106 aligns position member 116 and/or vertical tape support 120 with stripe 144 printed on visual sight 142 by looking through rear view mirror 132 or through a rear window of truck 102. This is shown by lateral alignment reference 134 in FIG. 1A.

Driver 106 can also determine the progress of longitudinal alignment (into and out of the page in the present view) as follows. As truck 102 pushes position member 116 through guide 100, driver 106 checks the height of alignment mark 146 through rear view mirror 132 as indicated by longitudinal alignment reference 138 shown in FIG. 1A. Additionally, driver 106 can see target mark 148 through rear view mirror 132, indicated by visual target reference 140 of FIG. 1A. The distance between alignment mark 146 and target mark 148 indicates to driver 106 the distance between the center of ball 108 of truck 102 and the center of receiver 110 of trailer 104. Because alignment mark 146 is not yet aligned with target mark 148, ball 108 is not aligned with receiver 110.

In the embodiments shown, alignment mark 146 and target mark 148 are each shown representationally as a simple black mark, however it should be noted that there are several possible embodiments of each. For example, alignment mark 146 and target mark 148 can be moveable stickers. A moveable alignment mark would be useful if different trucks were used to tow trailer 104. Similarly, a movable target mark 148 would be useful in the event that guide 100 would be attached to multiple trailers towed by truck 102. In another embodiment alignment mark 146 is simply the second end 128 of position member 116. Likewise, target mark 148 can simply be upper distal end 150 of vertical tape support 120, such that the alignment of second end 128 and distal end 150 indicate alignment of truck 102 and trailer 104. In yet another embodiment, target mark 148 can be disposed on rear view mirror 132 or the rear window of truck 102 such that it can be viewed by driver 106. If target mark 148 is disposed within truck 102, it can also function as visual sight 142 and be used to laterally align truck 102 and trailer 104. Finally, target mark 148 can be disposed on trailer 104 such that when viewed through rear view mirror 132 it is located either to the side of or above vertical tape support 120. Therefore, it should be noted that as used herein, the terms alignment mark and target mark should be interpreted to include at least those embodiments set forth above, as well as any other reference marks capable of indicating the vertical position of position member 116.

Figure 2A:
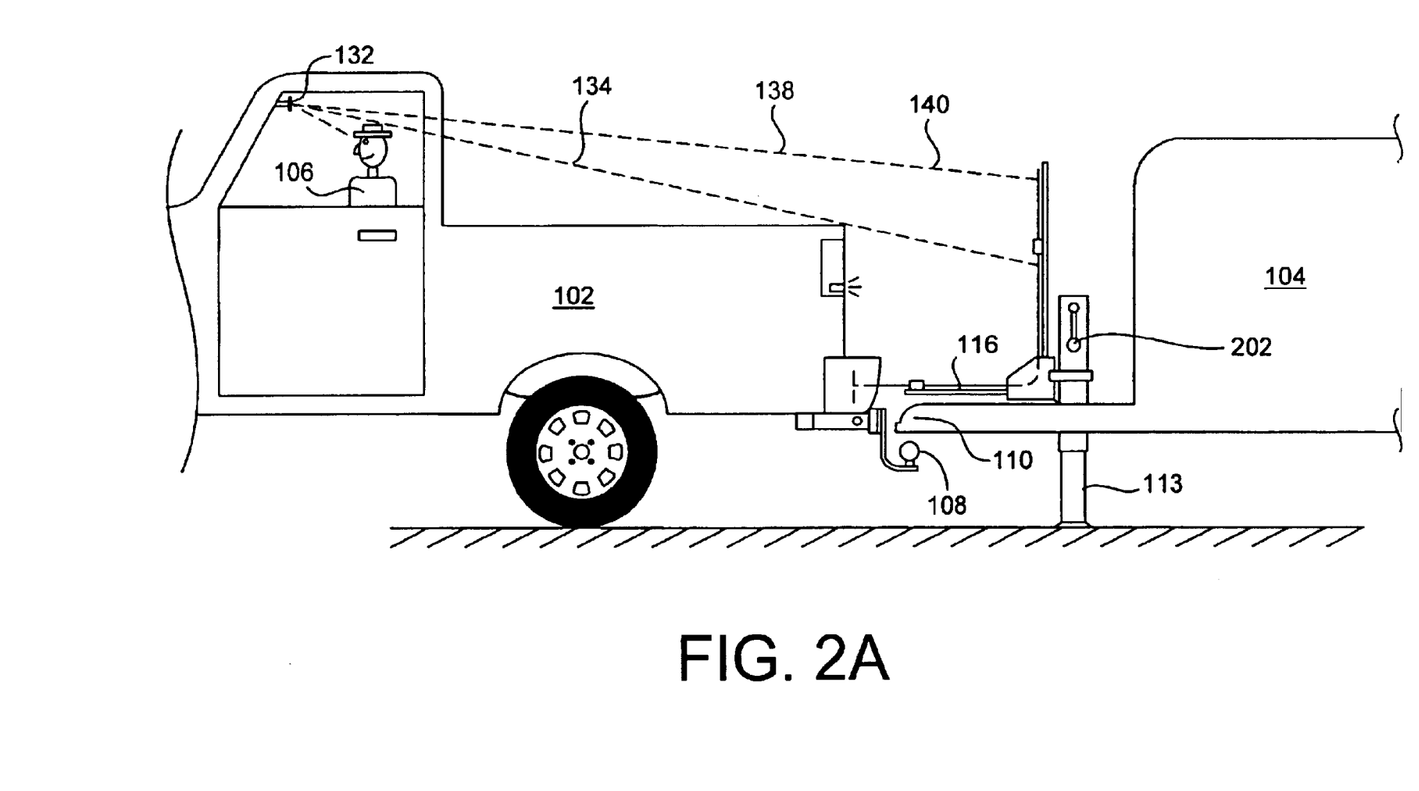
FIG. 2A shows the hitch ball of the tow vehicle aligned with the receiver of the trailer.
Figure 2B:
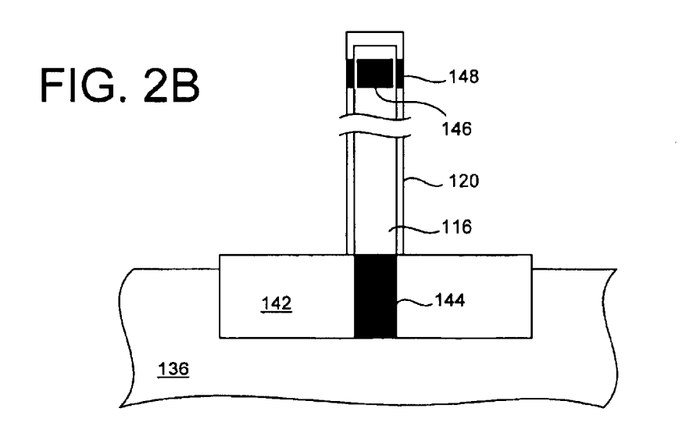
FIG. 2B is a view showing from the rearview mirror of FIG. 2A visual sight aligned laterally with a portion of the guide of the present invention, and showing the alignment mark aligned vertically with the target mark indicating alignment of the hitch ball of the tow vehicle with the receiver of the trailer.

FIG. 2A shows truck 102 aligned with trailer 104, such that ball 108 is aligned with receiver 110. In the present view, driver 106 has used visual lateral alignment reference 134 to maintain lateral alignment of truck 102 with trailer 104. Additionally, longitudinal alignment reference 138 is aligned with target reference 140 because alignment mark 146 is aligned with target mark 148 (FIG. 2B). Thus, driver 106 has aligned truck 102 with trailer 104 using guide 100 unassisted and without leaving truck 102. Receiver 110 can now be lowered onto ball 108 by cranking a jack handle 202 of jack 113, and trailer 104 can be hitched to truck 102.

FIG. 2B shows a portion of what driver 106 sees when looking through rear view mirror 132 when truck 102 is aligned with trailer 104. Because stripe 144 of visual sight 142 is still laterally aligned with position member 116 and vertical tape support 120, truck 102 and trailer 104 are also laterally aligned. In addition, truck 102 and trailer 104 are aligned longitudinally (i.e., ball 108 is under receiver 110) because alignment mark 146 is aligned with target mark 148.

To summarize, with reference to FIGS. 1A, 1B, 2A, and 2B, driver 106 uses guide 100 to align truck 102 with trailer 104 as follows. Once guide 100 is fastened to trailer 104, driver 106 extends first end 126 of position member 116 toward truck 102, and places visual sight 142 over tailgate 136. Driver 106 then backs truck 102 toward trailer 104, maintaining lateral alignment by keeping stripe 144 aligned with vertical tape support 120. Backing slowly, driver 106 engages license plate 130 with first end 126 of position member 116 and pushes position member 116 through horizontal tape support 122, body 114, and vertical tape support 120 while keeping stripe 144 of visual sight 142 aligned with vertical tape support 120 and position member 116. Driver 106 stops backing when alignment mark 146 has reached a predetermined height, which in this case is when it is aligned with target mark 148. Receiver 110 is then be lowered onto ball 108 by cranking jack handle 202, and the vehicles are coupled. By using guide 100 in this manner, driver 106 is able to align the two vehicles easily and unassisted.

It should be noted that guide 100 should be initially calibrated before it can be used. The calibration of guide 100 starts with truck 102 hitched to trailer 104. Optionally, trailer 104 can be disengaged from truck 102, and receiver 110 raised approximately one-half (½) to one (1) inch above ball 108. Next, mount 118 is loosely attached to jackpost 112 before body 114 and the rest of guide 100 is attached to mount 118. Guide 100 is positioned such that horizontal tape support 122 is inline with receiver 110 before mount 118 is tightly secured to jackpost 112. First end 126 of flexible position member 116 is then extended to truck 102 until it engages a flat surface thereof, such as license plate 130. Finally, alignment mark 146 and target mark 148 can be installed, aligned with one another, on position member 116 and vertical tape support 120, respectively. Alignment mark 146 and target mark 148 should be viewable through rearview mirror 132 by driver 106 when installed. Optionally, target mark 148 can be installed near upper distal end 150 of vertical tape support 120 during manufacture, or can be installed adjacent alignment mark 146 on the front face of trailer 104. Finally, visual sight 142 is installed and adjusted left to right such that stripe 144 appears aligned with vertical tape support 120 to driver 106, thus completing the calibration process.

Figures 3, 4:
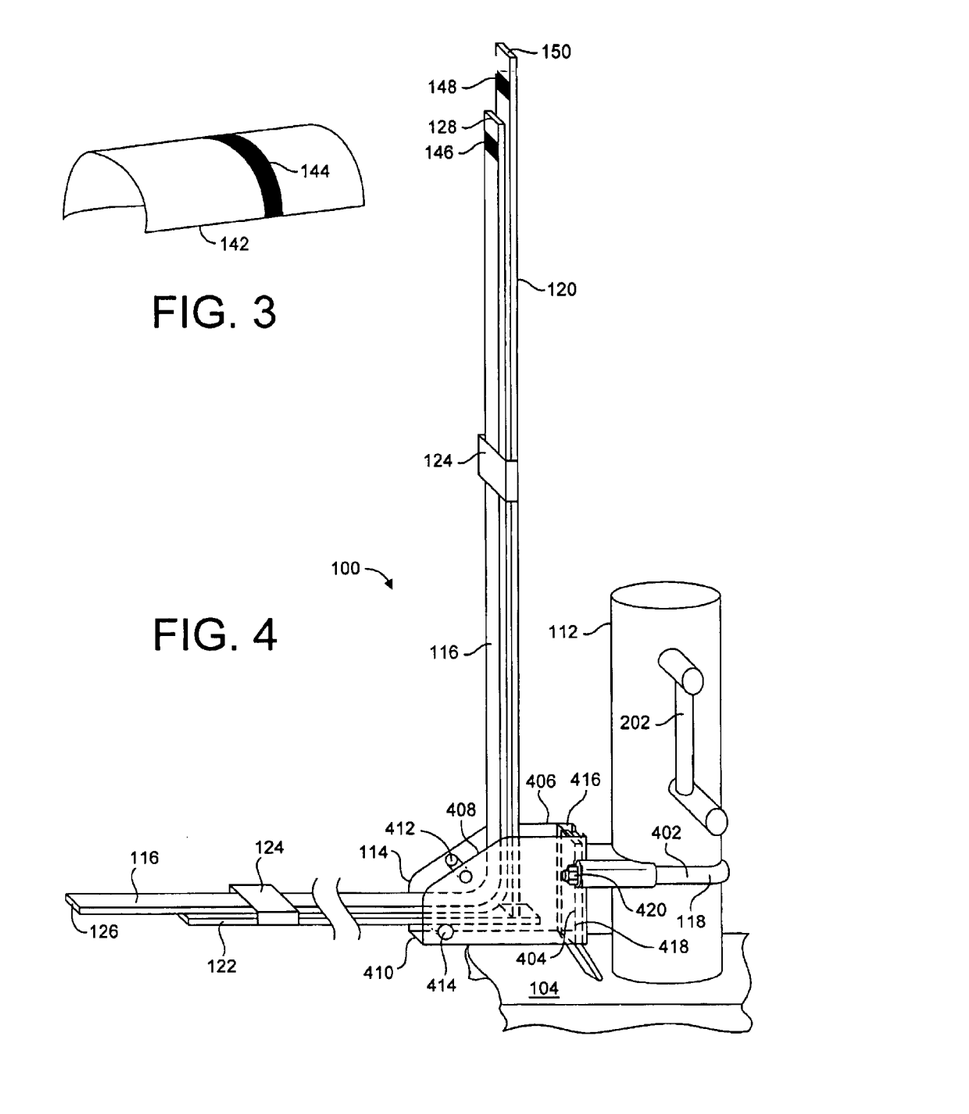
FIG. 3 is a perspective view of a visual sight for placing over the tailgate of the tow vehicle.
FIG. 4 is a perspective view of the guide of FIG. 1A.

FIG. 3 shows a perspective view of visual sight 142. In the present embodiment, visual sight 142 is made from vinyl and has a stripe 144 printed thereon. Visual sight 142 is made to lay over tailgate 136 during the hitching process of truck 102 and trailer 104. After truck 102 and trailer 104 are hitched, visual sight 142 can be removed from truck 102 and stored.

There are several alternate embodiments of visual sight 142. For example, a sticker placed on a rear window of truck 102 can function similarly to visual sight 142, as long as it is visible by driver 106 when looking through rear view mirror 132 and positioned inline with vertical tape support 120 and position member 116 from the viewing angle of driver 106. In another embodiment, such a sticker could be placed directly on rear view mirror 132, instead of or in addition to a mark on the rear window or tailgate 136. In yet another embodiment, a mark such as a stripe could be permanently or removably painted or placed on tailgate 136.

FIG. 4 is an enlarged perspective view showing the components of guide 100 in greater detail. Mount 118 facilitates selective coupling between jackpost 112 of trailer 104 and body 114 of guide 100, and is shown to include a first portion 402 and a second portion 404. First portion 402 of mount 118 is a standard O-clamp and can be engaged or disengaged from jackpost 112 by removing or securing a pair of fasteners 420 (only one shown) and separating clamp 402. Second portion 404 of mount 118 is a vertical member attached to the front of clamp 402. In the present embodiment, vertical member 404 is a piece of steel bar that is welded to the front of clamp 402. Once clamp 402 is coupled to jackpost 112, vertical member 404 is adapted to slidably engage a mounting channel 416 of body 114, thereby facilitating quick an easy installation and removal of body 114 onto or from mount 118.

Body 114 provides structure and support for guide 100. Body 114 is generally hollow and includes a first side wall 406, a second side wall 408, a bottom 410, a first brace 412, a second brace 414, and mounting channel 416 formed by a mounting wall 418. First side wall 406 and second side wall 408 are generally pentagonal in shape and are coupled together by bottom 410. Side walls 406 and 408 are further strengthened by first brace 412 and second brace 414, which in this embodiment are rivets passed through each of side walls 406 and 408. Mounting channel 416 is located toward the rear (right side) of body 114, and is a vertical channel formed by fixing (e.g., welding) mounting wall 418 between side walls 406 and 408. Bottom 410 extends from the front (left side) of side walls 406 and 408 to, but not passed, mounting wall 418. A bent portion of each of side walls 406 and 408 help form mounting channel 416 and will be discussed hereinafter. In the present embodiment, body 114 is formed from a weldable metal such as steel. Side walls 406 and 408 and bottom 410 can be fashioned from a single piece of sheet metal by stamping and/or bending. Mounting wall 418 can then be welded in place and rivets 412 and 414 can be inserted to prevent body 114 from deforming.

Vertical tape support 120 and horizontal tape support 122 extend from body 114. Horizontal tape support 122 is horizontally disposed between side walls 406 and 408 and through the front of body 114. Horizontal tape support 122 is supported by rivet 414 and is fabricated from a weldable metal, such as steel, and is optionally welded to both side walls 406 and 408 for added support. Functionally, horizontal tape support 122 supports first end 126 of position member 116 in a horizontal position and prevents position member 116 from deforming or buckling under its own weight. Therefore, horizontal position member 122 must be long enough to adequately support position member 116 when it is extended out past receiver 110 of trailer 104. Should position member 116 be adequately rigid, horizontal tape support 122 can be shortened or eliminated from guide 100 altogether.

Similarly, vertical tape support 120 extends vertically from in between side walls 406 and 408 to a height sufficient for driver 106 to view target mark 148 over tailgate 136. Vertical tape support 120 is fixed to side walls 406 and 408 in front of mounting wall 418 and above the fixed end of horizontal tape support 122. In the present embodiment, vertical tape support 120 is fabricated from a weldable metal, such as steel, and is welded to each of side walls 406 and 408.

Both vertical tape support 120 and horizontal tape support 122 include at least one of position member retainers 124. Position member retainer 124 on horizontal tape support 122 retains flexible position member 116 inline with horizontal tape support 122 when it is being pushed therethrough. Similarly, position member retainer 124 located on vertical tape support 120 retains position member 116 inline with vertical tape support 120, and prevents position member 116 from bending and buckling.

In the present view, position member 116 is also shown in greater detail. Position member 116 is flexible and makes a ninety (90) degree bend within body 114 near the junction of vertical tape support 120 and horizontal tape support 122. In the present embodiment, position member 116 is made of flexible steel tape which ensures sufficient rigidity to be pushed by truck 102 in addition to being flexible enough to bend within body 114. Such steel tape is typically used in retractable tape measures, which are commercially available. In addition to providing structure to body 114, rivet 412 functions to guide and retain the curved portion of position member 116 within body 114.

Finally, it should be noted that guide 100 can be made collapsible for easy storage. For example, because horizontal position member 122 is essentially cantilevered between fixed vertical position member 120 and rivet 410, it can be easily made removable such that guide 100 becomes collapsed for storage. In another embodiment, either vertical tape support 120 or horizontal tape support 122 is hinged at a distal end retained in body 114 and brace 412 is a removable pin, such that the hinged one of vertical tape support 120 and horizontal tape support 122 can be folded inline with the non-hinged member to collapse guide 100. Pin 412 can then be reinserted to retain guide 100 in a collapsed state. In the event that vertical tape support 120 is the hinged member, body 114 would require at least one detent or pimple (not shown) on one of side walls 406 or 408 to retain vertical tape support 120 in a vertical position when guide 100 is expanded. In another embodiment, vertical tape support 120 can be made removable. For example, a guideway can be formed within body 114 to retain vertical tape support 120 in position. In yet another example, vertical tape support 120 and horizontal tape support 122 can be fabricated such that they are telescoping members.

Figure 5:
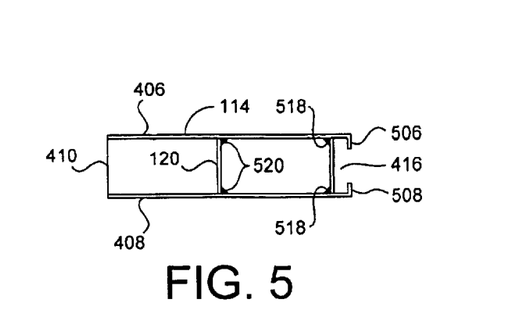
FIG. 5 is a top view of the main body of the guide of FIG. 4.

FIG. 5 shows a top view of body 114 wherein particular elements of body 114 can be seen in greater detail. First, the general shapes of first side wall 406 and second side wall 408 define the lateral bounds of the interior of body 114. In addition, the positions of vertical tape support 120 and mounting wall 418 are more clearly shown.

First side wall 406 includes an engaging portion 506, and similarly, second side wall 408 includes an engaging portion 508. In the present embodiment engaging portions 506 and 508 are portions of side walls 406 and 408, respectively, each making an inward bend toward the center of body 114. In this way, engaging portions 506 and 508, in combination with mounting wall 418, form mounting channel 416 which is adapted to engage a complementary second portion 404 of mount 118. Engaging portions 506 and 508 are shown in FIG. 4 to be the same height as body 114, however may optionally be taller or shorter than body 114. The height of engaging portions 506 and 508, however, must be sufficient to prevent deformation (e.g., bending) of engaging portions 506 and 508 and excessive sagging of guide 100 when body 114 is installed on mount 118.

Vertical tape support 120 and mounting wall 418 are shown to be installed vertically within guide 114. Vertical tape support 120 and mounting wall 418 are welded at the junction between themselves and each of side walls 406 and 408. A plurality of welds 518 retain mounting wall 418 in a fixed position with respect to body 114. Additionally, welds 518 strengthen body 114 and absorb the bending stresses exerted on mounting wall 418 by second portion 404 of mount 118 when guide 100 is installed thereon. In addition to being welded to each of side walls 406 and 408, mounting wall 418 may also be welded to bottom 410 of body 114. Similarly, a plurality of welds 520 couple vertical tape support 120 with each of side walls 406 and 408. Welds 520 retain vertical tape support 120 in a vertical position and absorb any bending stresses exerted on vertical tape support 120 by the movement of position member 116 or by natural forces acting on vertical tape support 120 such as wind or rain.

Figure 6A:
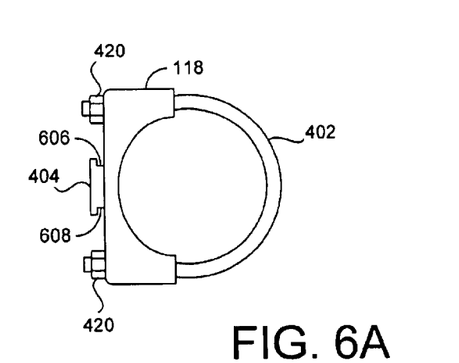
FIG. 6A is a top view of the mount shown in FIG. 4 for coupling the body of the guide to the jack post of the trailer.

FIG. 6A is a top view of mount 118 showing second portion 404 in greater detail. Second portion 404 includes complementary engaging portions 606 and 608, which are complementary in shape to engaging portions 506 and 508 of body 114. Complementary engaging portions 606 and 608 are adapted to slidably engage mounting channel 416 and facilitate the coupling of body 114 with mount 118. In the present example, complementary engaging portions 606 and 608 are slots which receive engaging portions 506 and 508. Alternatively, engaging portions 506 and 508 and complementary engaging portions 606 and 608 can be dovetailed to facilitate tighter engagement of each other.

Additionally, second portion 404 of mount 118 can be attached to first portion 402 in a variety of ways. For example, second portion 404 can be welded to first portion 402 if both are formed from a weldable metal such as steel. Optionally, second portion 404 can be glued to first portion 402 if the interface therebetween is not suitable for welding. It is expected that a strong glue, such as an epoxy, would be required to prevent unwanted separation of first portion 402 and second portion 404 of mount 118 during use. As yet another example, second portion 404 can be attached to first portion 402 with fasteners (e.g., screws).

Figure 6B:
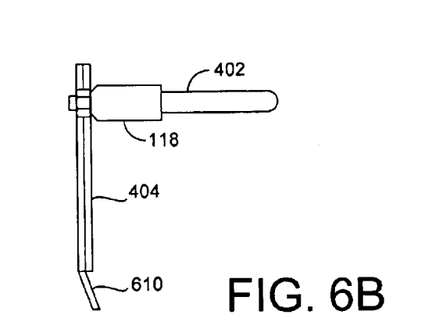
FIG. 6B is a side view of the mount of FIG. 6A.

FIG. 6B shows a side view of mount 118 and second portion 404. Second portion 404 includes an angled bottom distal end 610 that serves as a position stop. Bottom distal end 610 facilitates vertical positioning of body 114, and thus guide 100, with respect to mount 118. Body 114 is positioned when the bottom of mounting channel 416 abuts angled end 610. In addition, angled end 610 helps support the weight of guide 100 when it is positioned on a portion of trailer 104 (see FIG. 4).

Figure 7:
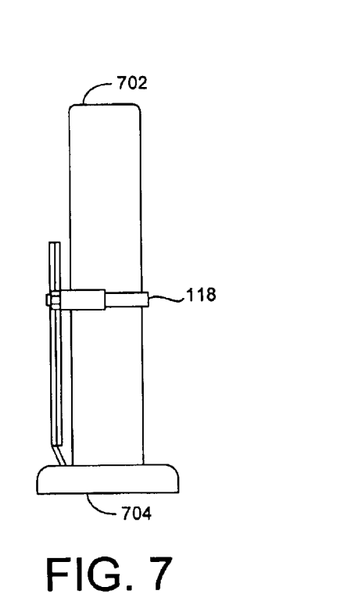
FIG. 7 shows the mount of FIGS. 6A and 6B attached to a removable magnetic base for engaging a trailer.

FIG. 7 shows mount 118 coupled to a removable base 702. Removable base 702 is used to couple mount 118 with a trailer not having a jackpost. It is common for some smaller trailers, such as boat or jet-ski trailers to not have jackposts. Removable base 702 has a magnetic bottom 704 which can be magnetically positioned on a trailer such that guide 1 00 will function properly when installed. Removable base 702 enables the added convenience of being able to remove the entire guide 100 completely from trailer 104. To that end, even if trailer 104 includes a jackpost 112, removable base 702 can be used. Optionally, removable base 702 can be fitted to a trailer in alternate ways, such as with fasteners (e.g., bolts, nuts, etc.), receiving tracks, or the like, but would require additional modification of the trailer.

Figure 8:
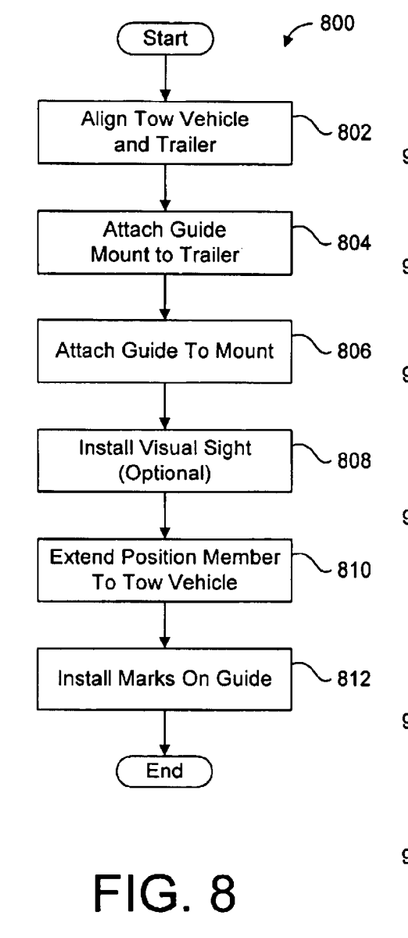
FIG. 8 is a flowchart summarizing one method of initially calibrating a guide of the present invention.

FIG. 8 shows a flowchart summarizing one method of calibrating guide 100 of the present invention. In a first step 802, driver 106 aligns ball 108 of truck 102 with receiver 110 of trailer 104 by, for example, unhitching a previously connected trailer 104 from truck 102. Then, in a second step 804, driver 106 installs mount 118 (or optionally removable base 702) to jackpost 112 of trailer 104 by securing 0-clamp 402 thereto. Next, in a third step 806, driver 106 attaches body 114 of guide 100 onto mount 118 by sliding mounting channel 416 of body 114 onto vertical member 404 of mount 118. Optionally, in a fourth step 808, driver 106 installs a visual sight (e.g., visual sight 142, a sticker on a rear window of truck 102, a sticker on rear view mirror 132, etc.) onto truck 102. Then, in a fifth step 810, driver 106 extends first end 126 of position member 116 toward truck 102 until it contacts a flat portion of truck 102, such as license plate 130. Finally, in a sixth step 812, driver 106 installs alignment mark 146 and, optionally if not already present, target mark 148 onto their respective portions of guide 100. Step 812 is optional if second end 128 of position member 116 is used as alignment mark 146, or if target mark 148 is pre-installed, or if upper distal end 150 of vertical tape support 120 is used as target mark 148.

Figure 9:
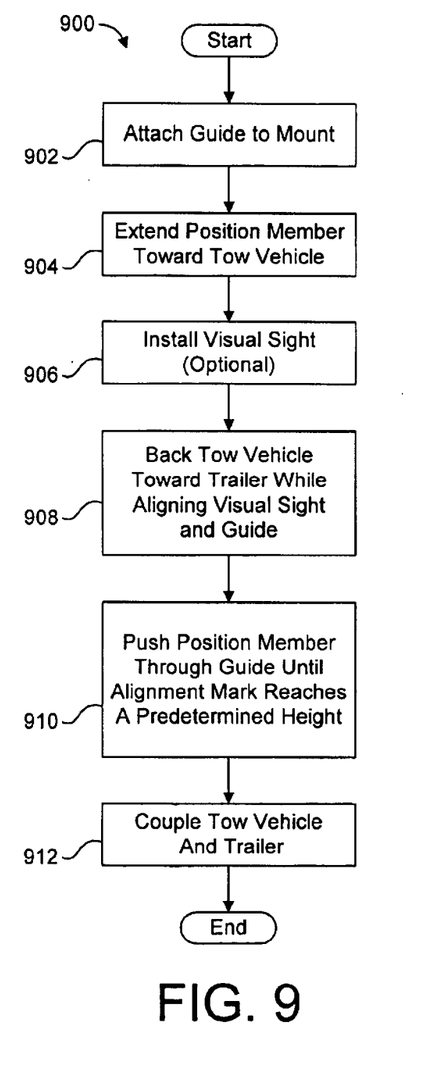
FIG. 9 is a flowchart summarizing one method of aligning a tow vehicle and a trailer using a guide of the present invention.

FIG. 9 shows a flowchart summarizing one method 900 for aligning and coupling tow vehicle 102 with trailer 104 using guide 100 of the present invention, assuming guide 100 has been previously calibrated. In a first step 902, driver 106 attaches guide 100 to mount 118 by sliding mounting channel 416 over second portion 404. Then, in a second step 904, driver 106 extends first end 126 of position member 116 toward tow vehicle 102. Next, in a third step 906, driver 106 installs visual sight 142 over the center of raised tailgate 136 of tow vehicle 102. Third step 906 is optional if the visual sight is a semi-permanent mark, such as a sticker or the like installed on a rear window or rear view mirror 132 of tow vehicle 102. Following, in a fourth step 906, driver 106 backs tow vehicle 102 toward trailer 104 while aligning stripe 144 of visual sight 142 with vertical tape support 120 of guide 100 to laterally align ball 108 of tow vehicle 102 with receiver 110 of trailer 104. This step is done by driver 106 viewing both visual sight 142 and guide 100 through a rear window of tow vehicle 102 or looking directly through rear view mirror 132. In a fifth step 910, tow vehicle 102 has contacted first end 126 of position member 116 and driver 106 backs tow vehicle 102 slowly, pushing position member 116 through body 114 until alignment mark 146 reaches a predetermined height, such as when it is aligned with target mark 148. Driver 106 views alignment mark 146 and target mark 148 through rear view mirror 132 or through a rear window of tow vehicle 102. Finally, in a sixth step 912, driver 106 couples tow vehicle 102 and trailer 104 by lowering jack 113 such that receiver 110 engages ball 108.

The description of particular embodiments of the present invention is now complete. Many of the described features may be substituted, altered or omitted without departing from the scope of the invention. For example, alternate visual sights (e.g., stickers or marks placed on the rear window or rear view mirror of the tow vehicle), may be substituted for the tailgate cover shown in the drawings. Further, although shown with a truck as the tow vehicle, it should be understood that the invention can be used with other tow vehicles including, but not limited to, cars and tractors. As another example, a horizontal piston assembly that, when pressed, will alter the height of a vertical column of fluid can be substituted for the flexible position member shown in the drawings. As yet another example, it should be understood that the longitudinal alignment and lateral alignment aspects of the present invention have utility both separately and in combination with one another. Thus, no aspect of the present invention is considered to be an essential element. These and other deviations from the particular embodiments shown will be apparent to those skilled in the art, particularly in view of the foregoing disclosure.

I claim:

1. A guide for aligning a tow vehicle with a trailer, said guide comprising:
    a flexible position member including a first end, a second end, and an alignment mark near said second end;
    a body adapted to slidably engage said position member such that said first end of said position member extends horizontally from said body, and said second end of said position member extends vertically from said body; and
    a mount for coupling said body to said trailer; and
    whereby, when said tow vehicle approaches said trailer said tow vehicle pushes said flexible position member through said body such that the height of said alignment mark is indicative of the distance between said tow vehicle and said trailer.

2. A guide for aligning a tow vehicle with a trailer according to claim 1, wherein said position member comprises a flexible steel tape.

3. A guide for aligning a tow vehicle with a trailer according to claim 1, wherein the position of said alignment mark is adjustable.

4. A guide for aligning a tow vehicle with a trailer according to claim 3, wherein said alignment mark comprises a movable sticker.

5. A guide for aligning a tow vehicle with a trailer according to claim 1, wherein said body further includes a vertical support adapted to support a generally vertical section of said position member.

6. A guide for aligning a tow vehicle with a trailer according to claim 5, wherein said vertical support includes at least one position member retainer.

7. A guide for aligning a tow vehicle with a trailer according to claim 5, wherein said vertical support includes a target mark such that the alignment of said alignment mark with said target mark is indicative of proper alignment of said tow vehicle with said trailer.

8. A guide for aligning a tow vehicle with a trailer according to claim 1, wherein said body further includes a horizontal support adapted to support a generally horizontal section of said position member.

9. A guide for aligning a tow vehicle with a trailer according to claim 8, wherein:
   said body includes a vertical support adapted to support a vertical section of said position member; and
   wherein at least one of said vertical support and said horizontal support is collapsible.

10. A guide for aligning a tow vehicle with a trailer according to claim 1, further comprising a target mark adapted for placement on one of said tow vehicle, said trailer, or said guide, such that the alignment of said alignment mark with said target mark is indicative of proper alignment of said tow vehicle and said trailer.

11. A guide for aligning a tow vehicle with a trailer according to claim 10, wherein the position of said target mark is adjustable.

12. A guide for aligning a tow vehicle with a trailer according to claim 10, wherein said target mark is visible in a rear view mirror of said tow vehicle.

13. A guide for aligning a tow vehicle with a trailer according to claim 1, wherein said guide further includes a visual sight adapted for mounting to said tow vehicle to facilitate lateral alignment of said tow vehicle and said trailer.

14. A guide for aligning a tow vehicle with a trailer according to claim 13, wherein said visual sight comprises a cover having a stripe thereon, said cover adapted for placement over a tailgate of said tow vehicle.

15. A guide for aligning a tow vehicle with a trailer according to claim 13, wherein said visual sight comprises a mark on said tow vehicle visible through a rear view mirror of said tow vehicle.

16. A guide for aligning a tow vehicle with a trailer according to claim 15, wherein said mark comprises a sticker placed on said rear view mirror.

17. A guide for aligning a tow vehicle with a trailer according to claim 15, wherein said mark comprises a sticker placed on a rear window of said tow vehicle.

18. A guide for aligning a tow vehicle with a trailer according to claim 1, wherein said mount comprises:
   a first portion for engaging said trailer; and
   a second portion adapted to detachably engage said body of said guide.

19. A guide for aligning a tow vehicle with a trailer according to claim 18, wherein said first portion of said mount comprises a clamp.

20. A guide for aligning a tow vehicle with a trailer according to claim 19, wherein said second portion comprises a vertical member adapted to slidably engage a portion of said body.

21. A guide for aligning a tow vehicle with a trailer according to claim 20, wherein a portion of said body and a complementary portion of said vertical member of said mount are dovetailed to facilitate slidable engagement of said vertical member and said body.

22. A guide for aligning a tow vehicle with a trailer according to claim 20, wherein at least a portion of said vertical member is slotted to receive a portion of said body.

23. A guide for aligning a tow vehicle with a trailer according to claim 20, wherein the bottom distal end of said vertical member includes a position stop to vertically position said guide when said body and said vertical member are engaged.

24. A guide for aligning a tow vehicle with a trailer according to claim 1, further comprising a removable base, said removable base adapted to magnetically engage said trailer, and to facilitate the attachment of said mount thereto.

25. A guide for aligning a tow vehicle with a trailer according to claim 1, wherein said position member is disposed so as to engage a flat portion of said tow vehicle.

26. A guide for aligning a tow vehicle with a trailer according to claim 1, wherein one portion of said position member is disposed over said receiver.

27. A guide for aligning a tow vehicle with a trailer according to claim 1, wherein said guide further comprises:
   a visual sight adapted to engage said tow vehicle and to a laterally align said tow vehicle and said trailer; and
   a target mark such that the alignment of said alignment mark with said target mark is indicative of proper alignment of said tow vehicle and said trailer; and
   wherein said visual sight and said target mark comprise the same mark.

28. A method for aligning a tow vehicle with a trailer using a guide, said method comprising:
   fitting said trailer with said guide, said guide including a flexible position member having a first end and a second end, and a body adapted to slidably engage said position member such that said first end of said position member extends horizontally from said body and said second end of said position member extends vertically from said body;
   extending said first end of said flexible position member toward said tow vehicle;
   backing said tow vehicle toward said trailer to engage said first end of said position member with said tow vehicle; and
   pushing said position member through said guide until said second end of said position member reaches a predetermined height.

29. A method for aligning a tow vehicle with a trailer using a guide according to claim 28, wherein said step of fitting said trailer with said guide includes detachably mounting said guide to said trailer.

30. A method for aligning a tow vehicle with a trailer using a guide according to claim 29, wherein said step of detachably mounting said guide includes sliding a portion of said guide over a complementary mount fixed to said trailer.

31. A method for aligning a tow vehicle with a trailer using a guide according to claim 29, wherein said step of detachably mounting said guide to said trailer includes magnetically coupling a removable base to said trailer.

32. A method for aligning a tow vehicle with a trailer using a guide according to claim 28, wherein:

said position member includes an alignment mark disposed near said second end; and said step of pushing said position member further includes pushing said position member through said guide until said alignment mark reaches a predetermined height.

33. A method for aligning a tow vehicle with a trailer using a guide according to claim 32, wherein:

one of said guide, said tow vehicle, and said trailer includes a target mark; and said step of pushing said position member further includes pushing said position member through said guide with said tow vehicle until said alignment mark is aligned with said target mark.

34. A method for aligning a tow vehicle with a trailer using a guide according to claim 28, wherein:

said tow vehicle includes a visual sight; and said method of aligning said tow vehicle with said trailer further includes the step of laterally aligning said tow vehicle with said trailer by laterally aligning said visual sight with a portion of said guide.

35. A method for aligning a tow vehicle with a trailer using a guide according to claim 28, further comprising a step of initially calibrating said guide, said step of initially calibrating said guide comprising:

aligning said tow vehicle and said trailer;

attaching said guide to said trailer;

extending said first end of said position member toward said tow vehicle until it contacts said tow vehicle; and recording the vertical position of said second end of said position member as said predetermined height.

* * * * *